(12) United States Patent
Markert

(10) Patent No.: US 10,429,260 B2
(45) Date of Patent: Oct. 1, 2019

(54) TIRE PRESSURE SENSING DEVICE AND METHOD FOR THE PRODUCTION THEREOF

(71) Applicant: ALLIGATOR VENTILFABRIK GMBH, Giengen (DE)

(72) Inventor: Christian Markert, Herbrechtingen (DE)

(73) Assignee: ALLIGATOR VENTILFABRIK GMBH, Giengen (DE)

( * ) Notice: Subject to any disclaimer, the term of this patent is extended or adjusted under 35 U.S.C. 154(b) by 130 days.

(21) Appl. No.: 14/383,303

(22) PCT Filed: Feb. 28, 2013

(86) PCT No.: PCT/EP2013/054003
§ 371 (c)(1),
(2) Date: Sep. 5, 2014

(87) PCT Pub. No.: WO2013/131799
PCT Pub. Date: Sep. 12, 2013

(65) Prior Publication Data
US 2015/0013444 A1    Jan. 15, 2015

(30) Foreign Application Priority Data
Mar. 7, 2012    (DE) .................. 10 2012 004 333

(51) Int. Cl.
*B60C 23/04*    (2006.01)
*G01L 17/00*    (2006.01)
*G01L 19/00*    (2006.01)

(52) U.S. Cl.
CPC ............ *G01L 17/00* (2013.01); *B60C 23/04* (2013.01); *B60C 23/0494* (2013.01); *B60C 23/0498* (2013.01); *Y10T 29/49826* (2015.01)

(58) Field of Classification Search
CPC ............ B60C 23/0494; B60C 23/0498; B60C 23/0452
See application file for complete search history.

(56) References Cited

U.S. PATENT DOCUMENTS 3,787,806 A * 1/1974 Church ............... B60C 23/0493
116/34 R
5,844,131 A    12/1998 Gabelmann et al.
(Continued)

FOREIGN PATENT DOCUMENTS

CN    101354302    1/2009
DE    196 26 145    1/1998
(Continued)

OTHER PUBLICATIONS

Office Action dated Apr. 6, 2016 in corresponding Chinese Application No. 201380013035.2 and English language translation of the same.
(Continued)

*Primary Examiner* — Jill E Culler
*Assistant Examiner* — Ruben C Parco, Jr.
(74) *Attorney, Agent, or Firm* — Faegre Baker Daniels LLP

(57) ABSTRACT

The invention relates to a tire pressure sensing device for detecting the tire pressure in a pneumatic tire, comprising a pressure sensor (6) in a housing (1); a tire valve (11) or another retainer to be fastened to the rim, which bears the housing; a spring element (2), which is connected to the tire valve or the other retainer at one end and to the housing (1) at the other end, wherein the spring element is partially embedded in the housing and the housing has at least one opening (4, 5) in the area in which the spring element is
(Continued)

embedded, said opening being partially or completely opened up by a soft component (13), which partially surrounds the spring element.

24 Claims, 3 Drawing Sheets

(56) References Cited

U.S. PATENT DOCUMENTS

| | | | |
|---|---|---|---|
| 5,956,820 | A | 9/1999 | Albinski |
| 6,662,665 | B1 | 12/2003 | Huang |
| 6,895,810 | B2 | 5/2005 | Saheki et al. |
| 7,017,403 | B2 | 3/2006 | Normann et al. |
| 7,185,535 | B2 | 3/2007 | Beckley et al. |
| 8,047,068 | B2 | 11/2011 | Hamm et al. |
| 8,813,773 | B2 | 8/2014 | Palaoro et al. |
| 2003/0112137 | A1 | 6/2003 | Saheki |
| 2004/0163456 | A1* | 8/2004 | Saheki ................ B60C 23/0494 73/146.8 |
| 2004/0252072 | A1* | 12/2004 | Adamson ................ B60C 11/00 343/873 |
| 2006/0021426 | A1* | 2/2006 | Pozzi ................ B60C 23/0494 73/146.8 |
| 2006/0044118 | A1* | 3/2006 | Katou ................ B60C 23/0408 340/425.5 |
| 2006/0061463 | A1* | 3/2006 | Wilson, II ........... B60C 23/0408 340/447 |
| 2006/0272402 | A1 | 12/2006 | Yin et al. |
| 2007/0113637 | A1 | 5/2007 | Blossfeld |
| 2010/0064791 | A1* | 3/2010 | Chuang ............... B60C 23/0494 73/146.8 |
| 2011/0079337 | A1* | 4/2011 | Botte ................. B60C 23/0408 152/415 |
| 2012/0222478 | A1* | 9/2012 | Kanenari ............ B60C 23/0408 73/146.5 |
| 2013/0069775 | A1* | 3/2013 | Lee ..................... B60C 23/0494 340/442 |

FOREIGN PATENT DOCUMENTS

| | | | |
|---|---|---|---|
| DE | 100 19 082 | | 10/2001 |
| DE | 100 47 853 | | 2/2002 |
| DE | 101 31 411 | | 2/2003 |
| DE | 103 39 959 | | 4/2005 |
| DE | 10 2009 035 385 | | 2/2010 |
| DE | 20 2009 007 703 | | 6/2010 |
| EP | 0 751 017 | | 9/1999 |
| EP | 1 751 017 | | 9/1999 |
| EP | 1 321 314 | | 6/2003 |
| EP | 1 449 683 | | 12/2006 |
| EP | 2 094 514 | | 3/2010 |
| JP | 2003-165315 | | 6/2003 |
| JP | 2004255916 | | 9/2004 |
| JP | 2004-345485 | | 12/2004 |
| JP | 2005537166 | | 12/2005 |
| JP | WO 2011058743 | A1 * | 5/2011 ......... B60C 23/0408 |
| WO | 2008/055944 | | 5/2008 |

OTHER PUBLICATIONS

International Search Report dated Jun. 10, 2013 in corresponding International Application No. PCT/EP2013/054003.
Office Action dated Apr. 6, 2016 in corresponding Japanese Application No. 201380013035.2.
International Preliminary Report on Patentability dated Sep. 9, 2014 in corresponding International Application No. PCT/EP2013/054003.
Japanese Office Action dated Oct. 24, 2016 in correspondence Japanese Application No. 2014-560310.

* cited by examiner

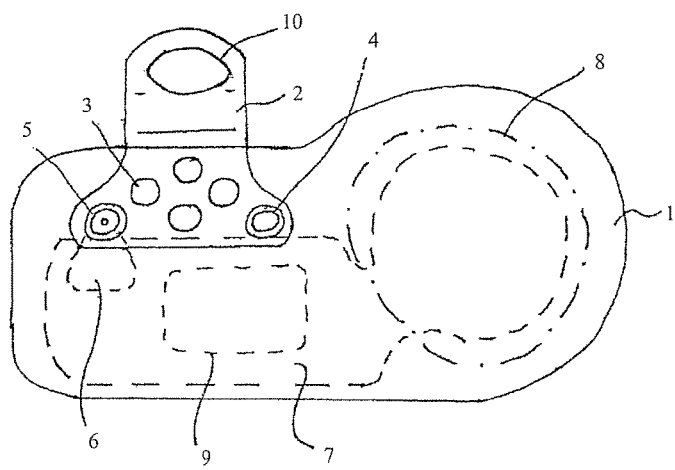
Fig. 1
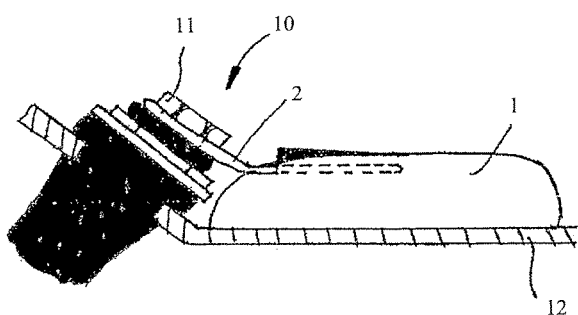
Fig. 2
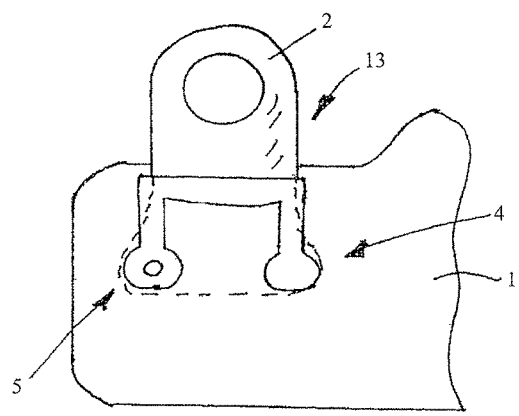
Fig. 3
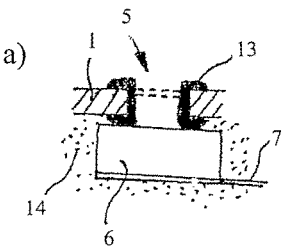

TIRE PRESSURE SENSING DEVICE AND METHOD FOR THE PRODUCTION THEREOF

CROSS-REFERENCE TO RELATED APPLICATION

The present application is a National Stage of International Application No. PCT/EP2013/054003, filed Feb. 28, 2013, which claims priority to DE 10 2012 004 333.3, filed Mar. 7, 2012, the entire disclosures of which are hereby expressly incorporated herein by reference.

The present invention concerns a tyre pressure sensing device for detecting the tyre pressure in a pneumatic tyre, in detail according to the preamble of claim 1. A method of manufacturing a tyre pressure sensing device according to the invention is also provided.

Tyre pressure control systems, as they are used extensively in the USA and become used increasingly in Europe in passenger cars and lorries, contain inside the pneumatic tyre on a vehicle rim a pressure sensor which detects the pressure inside the pneumatic tyre and sends it by means of an associated transmission device to a receiver outside the pneumatic tyre, usually integrated to the on-board electronics of the vehicle, in the form of appropriate signals. The market has witnessed the development of a form of embodiment with which the pressure sensor is contained together with the transmission device in a housing, usually a plastic housing, which can be cast by way of example with a casting compound, whereas the housing is connected either immediately to the pneumatic tyre via which air is guided into the pneumatic tyre or is discharged therefrom or according to an alternative form of embodiment to another retainer to be fastened to the rim. By way of example, documents EP 0 751 017 B1 and US 2007/0113637 A1 disclose different possibilities for fastening a housing containing the pressure sensor on a tyre valve with a spherical axial end, to which the housing is screwed either directly or via an interposed flange.

To enable to mould to nest the housing as far as possible to the rim or to the so-called rim base, it has already been suggested to connect the housing in an articulated manner and angularly adjustable to the tyre valve so that the angle can be adjusted between the tyre valve and the housing according to the respective present flange angle of the rim. Moreover, spring elements, pushed via the housing, have been suggested, by means of which the housing is pressed against the axial end which is domed in particular spherically, to guarantee safe contact, see for instance documents DE 100 47 853 B4, DE 196 26 145 A1 and DE 101 31 411 A1. The last-mentioned publication suggests moreover to design the pushed-away and bent spring element in such a way that it additionally presses or draws the housing against the rim base.

Documents DE 103 39 959 B4 and EP 103 39 959 B4 suggest coil springs wound around the valve stem by means of which the housing should also press against the tyre valve. Moreover, both protruding ends of the coil spring can be used according to the first mentioned step in order to press the housing against the rim base.

The represented forms of embodiments have the shortcoming that with particularly flange angles of rims, the housing cannot be set reliably and nor pressed continuously with the pressure sensor on the rim base, not sufficiently any way. Moreover; a plurality of specialised and complex valve designs is necessary for the connection.

The European patent specification EP 2 094 514 B1 suggests to provide a connecting part between valve and housing, which enables an elastic connection between the valve and the housing by means of a connecting part and provides at the same time a receptacle for a gasket. The housing can be cast on an end region of the fastening element.

The European patent specification EP 1 449 683 B1 also suggests to provide a leaf spring between the valve and the housing whereas the leaf springs contain openings through which fused protrusions of the housing mesh in a locking manner. When the rim rotates more slowly, the leaf spring presses against the rim. At higher rotating speeds, the housing is lifted from the rim whereas the lifting movement is limited by the impact of protruding side walls of the leaf spring which are U-shaped. The side walls prevent moreover the housing from twisting with respect to the valve.

Also with both forms of embodiments last represented which enable comparatively safe retaining of a spring element generation a pressure against the rim in the housing, the manufacturing processes and the associated costs are quite high, which is extremely detrimental with mass articles as they represent the tyre pressure sensing devices of reference. Moreover, the construction or the operating mode can easily adapt to different usage profiles.

US 2006/0272402 A as well as DE 100 19 082 A1 describe tyre pressure sensing devices with a housing, which is not provided to be set on a rim but is maintained inside the air chamber of the tyre. According to document EP 1 321 314 A2, the housing of a tyre pressure sensing device is maintained away from the rim. The same goes for the housing of a tyre pressure sensing device of a snap-in tyre valve according to document DE 10 2009 035 385 A1. Finally, JP 2004345485 A describes a housing of a tyre pressure sensing device maintained at a distance of the rim.

The object of the present invention is to provide a tyre pressure sensing device of the represented type which guarantees safe and continuous placement of the housing on the rim base at the most different flange angles, avoids mistakes during assembly and enables at the same to achieve cost-efficient producibility. At the same time, the tyre pressure sensor according to the invention should be robust and enable long failure-free service life. An advantageous method of manufacturing a tyre pressure sensing device according to the invention shall be also provided.

The object of the invention is satisfied with a tyre pressure sensing device exhibiting the features of claim 1. Advantageous and particularly appropriate embodiments of the invention are disclosed in the dependent claims. A method according to the invention is also provided.

A tyre pressure sensing device according to the invention for detecting the tyre pressure in a pneumatic tyre contains a housing which has at least one contact surface for putting onto a rim carrying the pneumatic tyre and houses a pressure sensor. Moreover, a tyre valve or another retainer to be fastened to the rim is provided, for example a web or pin protruding from the rim or an element meshing through the rim, which carries the housing.

Finally, the tyre pressure sensing device according to the invention includes at least one spring element which is connected on the one hand to the tyre valve or to the retainer to be fastened to the rim and is connected on the other hand to the housing.

The spring element is embedded partially into the housing and the housing in the area in which the spring element is embedded, comprises at least one opening partially or completely sealed by a soft component which surrounds the spring element partially.

Such a soft component is characterised in that it has a reduced hardness and a higher elasticity than the housing, which in particular is injected of synthetic material. The soft component can consist for instance of a rubber or an elastomer, in particular a thermoplastic elastomer (TPE elastomer).

Advantageously, the soft component seals up against the housing a pressure sensor provided inside the housing, the sensor for example mounted on a circuit board, especially by brazing, inside said housing. To do so, the opening can be opposed to the pressure sensor in the housing, in which the soft component is inserted in order to seal said opening partially or completely in the context of the invention, in such a way that the air whose pressure should be detected, can flow through an opening in the soft component towards the pressure sensor. Alternately, a partial region of the soft component forms a membrane or the soft component acts as a membrane which forwards the pressure of the surrounding air to the pressure sensor.

The housing which surrounds the pressure sensor or in particular additional structural elements, such as for instance the circuit board and/or a battery, as well as advantageously an electronic control unit and/or other sensors, can be filled with a casting compound after installation of these structural elements necessary for the function of the tyre pressure sensing device. The casting compound consists advantageously of another material than the soft component. For instance, the casting compound is harder after having set, i.e. less elastic than the soft component. The casting compound usually consists of another material than the housing. Particularly advantageously, the spring element is not penetrated by the casting compound.

A form of embodiment provides that another opening is arranged in addition to the opening for the pressure sensor in the housing, through which the spring element can be gripped before closing the opening with the soft component in order to hold it during the process of embedding it into the housing. Also the opening can be used for the pressure sensor for gripping the spring element. If for instance the housing is cast, in particular injection moulded and the spring element is cast into the housing during the casting process, so can the spring element be retained through the opening for the pressure sensor or through both openings, whereby the second opening is designated as assembly opening, until the surrounding housing has hardened sufficiently. Subsequently, the openings can be sealed partially or completely with the soft component, for example filled with said soft component.

Providing the soft component in the opening of the pressure sensor in the housing, in particular for sealing the pressure sensor against the housing enables advantageously that the vibrations of the rim are absorbed and are not forwarded to the pressure sensor, or only in an attenuated manner. At the same time, necessary sealing elements can be dispensed with.

If additionally the spring element is coated with the soft component on its surface outside the housing partially or completely, damages to the tyre can be ruled out during pulling the tyre on the rim, due to the spring element which might be sharp-edged.

According to an execution of the invention, the spring element is connected as a single-piece with the housing. By single-piece is meant in this sense that the spring element is not clipped simply in a detachable manner onto the housing and is retained there by spring tension so that the spring element can be separated in all cases from the housing by detaching a positive-locking connection, for instance such as a screw connection.

Advantageously, said at least one spring element is not only connected as a single-piece with the housing, but is connected in a non-detachable way to the housing. The undetachability can be achieved for instance by a firmly bonded or positive connection to the housing. Additionally or alternately, the spring element can be penetrated by the material of the housing, contain subsequently one or several passage openings through which the material of the housing, in particular designed as a single-piece protrudes.

As illustrated, the housing can be for example cast of synthetic material, in particular injection moulded and the spring element can be inserted into the casting mould before the casting process or before the finish casting process, so that the spring element is cast into the housing after the casting process.

A form of embodiment provides that the spring element exerts a prestress onto the housing to as to press it against the rim.

In an embodiment according to the invention, the spring element is designed as a leaf spring, for instance made of spring steel. Such a leaf spring can include advantageously in non-tensioned condition an even or a substantially even extension. According to an alternative form of embodiment the leaf spring has the form of an angle with two even legs. However, the legs can also alternately contain curves or angles of bend.

The spring element can contain for example a bore at one of its axial ends, in particular a bore closed over the circumference, through which the tyre valve or a stem of the tyre valve is inserted. It is in such a case particularly advantageous to coat the spring element with the soft component in the region of the bore a soft component which prevents the spring element from twisting with respect to the tyre valve since it generates a strong frictional contact. Also, the soft component can constitute a complementary form to an associated region of the valve so as to facilitate a targeted relative positioning of the spring element and hence of the housing and of the valve. Advantageously, the soft component builds with a complementary form a positive-locking fit with one or several undercuts. What has been said before is also valid when the spring element is connected to another retainer as the tyre valve.

According to an embodiment, the spring element consists of metal, for instance of steel. Alternately, said element can be made of carbon or with carbon. Other materials are possible.

According to a concept of the invention, it is provided that the housing contains a signal transmitting device, which is connected to the pressure sensor, in order to send signals corresponding to pressure values detected by the pressure sensor to a receiving device provided outside the tyre pressure sensing device, whereas the spring element is connected operationally as an aerial (antenna) or as a signal-carrying connection to an aerial at the signal transmitting device. To do so, the spring element should appropriately consist of metal or another conductive material.

The spring element, in particular when it acts as an aerial or is provided as a signal-carrying connection for an aerial, can be in conductive contact with the tyre valve or with the other retainer to be fastened to the rim, so as to transfer signals of the signal transmitting device to the tyre valve or to the other retainer to be fastened to the rim, whereas in such a case, the valve or the other retainer can be used as an aerial.

A form of embodiment provides that the spring element forms a rod aerial and contains correspondingly a single supply connection with the signal transmitting device. An alternative form of embodiment provides that the spring element forms a loop aerial and hence is linked to the signal transmitting device via two or several connections.

The soft component can also be incorporated in a targeted manner as an electrical insulator to configure the size of the aerial. By way of example, the spring element and an additional aerial can be produced as a single part and be embedded at least partially into the housing. Just after, one or several contact points between the spring element and the aerial are severed whereas the contact points are accessible through assembly openings provided in the housing or through openings to be inserted. Subsequently, the severed points are filled with the soft component acting as an insulator and in particular the assembly openings or various openings are sealed, whereas advantageously the whole soft component is applied in a single pass, by way of example subsequent to the injection moulding process of the housing.

The soft component enables exact tuning of the aerial through the electrical insulation with respect to the spring element or, when the spring element is used as an aerial, is possible by electrical insulation with respect to the valve.

For even better fit of the housing on the rim or on the rim base, a battery provided in the housing and used by way of example for the supply of current of the pressure sensor and/or by the signal transmitting device, can be oriented at an angle to the bottom surface or surface of the pressure sensor and/or a circuit board carrying the pressure sensor, so that the housing can taper conically on an end in the circumferential direction and/or be designed at an angle with respect to the remaining housing part.

According to an embodiment, the pressure sensor does not only record the pressure but also one or several additional variables. Solely by way of examples, these variables can be the temperature, the battery voltage and the acceleration or the rotary acceleration of the rim. Additionally or alternately, one or several more sensors can be provided for recording one or several of these variables in or on the housing, the tyre valve and/or the retainer.

The invention will now be described by way of example using an example of embodiment.
The figures are as follows:

FIG. 1 shows a diagrammatical elevation view on a tyre pressure sensing device designed according to the invention;

FIG. 2 shows a diagrammatical lateral view of the tyre pressure sensing device from FIG. 1:

FIG. 3 shows an elevation view on a part of the housing of FIG. 1 with a soft component placed thereon;

Figure 4:
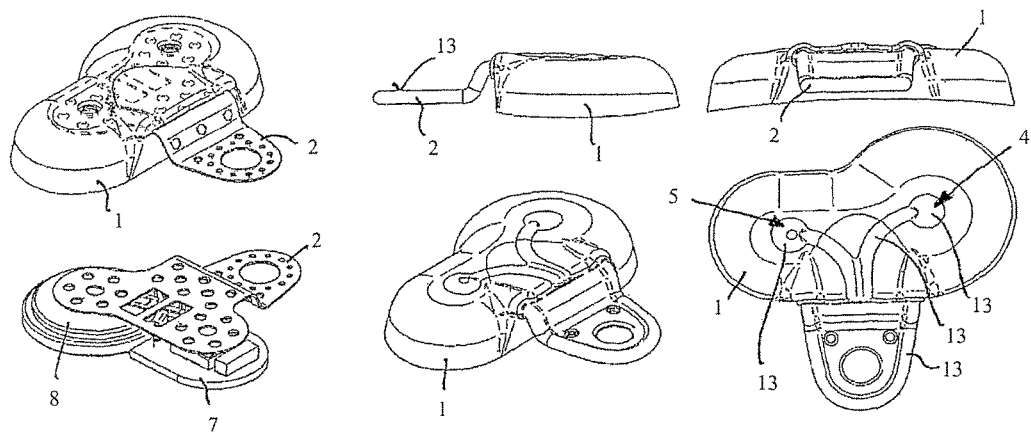
FIG. 4 shows different views of an exemplary embodiment of the invention.

FIG. 1 represents in concentric lines the contour of the housing 1 of a tyre pressure sensing device designed according to the invention as well as a spring element 2 protruding from the housing 1. The spring element 2 contains passage openings 3, through which the material of the housing 1 is cast so that the spring element 3 inside the housing 1 is locked with unercuts in a positive locking manner.

The region of the spring element 2 contains moreover in the housing 1 a first assembly opening 4 which is used for retaining the spring element 2 when casting the housing 1 at the desired position. A second opening 5 provides a compressed-air carrying connection of the pressure sensor 6 arranged inside the housing 1 to the surrounding atmosphere of the housing 1 which is constitutes by the inner space of the pneumatic tyre (not represented). The pressure sensor 6 is positioned on a circuit board 7 by means of which a connection to the power supply 8, here in the form of a battery inserted in the housing 1, is provided.

In the form of embodiment of the invention represented by way of example on Figure, the circuit board 7 moreover carries a signal transmitting device 9, which sends the pressure values detected by the pressure sensor 6 as signals to a receiver positioned outside the tyre pressure sensing device in the vehicle (non represented). It goes without saying that said signal transmitting device 9 could also be integrated in the pressure sensor 6. Advantageously, the purpose of the circuit board 7 is to provide a suitable electrical link between the pressure sensor 6 and the signal transmitting device 9 as well as between the power supply 8 and the signal transmitting device 9.

In the illustrated exemplary embodiment, the circuit board 7 moreover provides a electrical connection between the spring element 2 and the signal transmitting device 9, for which reason the spring element 2 rests on the circuit board 7. Therefore, the spring element 2 can act as an aerial for the signal transmitting device 9. If moreover the spring element 2 constitutes a electrical connection to the tyre valve (non represented in FIG. 1), which is inserted into the passage opening 10 at the external end of the spring element 2, then additionally or alternately another retaining device can also be used instead of the tyre valve.

The form of embodiment represented in FIG. 1 illustrates the axial end of the spring element 2, which carries the passage opening 10, angled with respect to the part embedded in the housing 1. According to another form of embodiment, the spring element 2, advantageously made of spring steel, could have however an even form in non-prestressed condition.

FIG. 2 illustrates the tyre pressure sensing device in a lateral view, connected to a tyre valve 11 and placed on a rim 12. As can be seen, the tyre valve 11 reaches through the passage opening 10 in the spring element 2 and is anchored on both sides of the passage opening 10 on the spring element 2. It goes without saying that another form of embodiment could be envisioned. Due to the prestress exerted by the spring element 2 to as to press the housing against the rim 12 and hence simultaneously to press against the tyre valve 11 away from the pneumatic tyre, it is possible to dispense if needed with the locking system represented here, by way of example by a nut or a screw, on the side of the spring element 2 facing away from the opening in the rim 12.

FIG. 3 represents once more the region of the tyre pressure sensing device or of the housing 1 with the spring element 2, so as to clarify any possible coating with a soft component 13. In the exemplary embodiment represented, the protruding part of the spring element 2 protruding at the housing 1 is coated with the spring component 13, as well as a portion 1 which is positioned in the region of the spring element 2 or covers the spring element 2, see the contour of the embedded region of the spring element 2, represented in dotted lines. The soft component 13 on the housing 1 seals on the one hand the assembly opening 4 and on the other hand the opening 5 for the pressure sensor, the latter at least partially. As shown in detail a, the soft component 13 meshes around the edges of the housing 1 in the region of the opening 5, so that the pressure sensor 6 leaves the inside of the housing 1 and moves against the soft component 13 acting as a gasket, so as to rest finally. This prevents the casting compound 14, by means of which the housing 1 is poured out with after insertion of the necessary structural elements for the function of the tyre pressure sensing device, from flowing into the opening 5 and into the pressure sensor 6, thereby closing them undesirably.

As indicated by the dotted lines, the soft component or another component might close the opening 5 in the way of a membrane and thereby being deformed elastically so as to transfer the pressure from the inside of the chamber in the pneumatic tyre to the pressure sensor 6 in the inside of the housing 1.

The soft component 13 on the spring element 2 prevent the tyre from being damaged when it is pulled on the rim.

The end of the spring element 2 with the passage opening 10 can also be coated with the soft component in such a way that the spring element 2 is insulated with respect to the tyre valve 11 or another retainer which carries the housing 1. This enables adequate tuning if the spring element 2 operates as an aerial.

Figure 5:
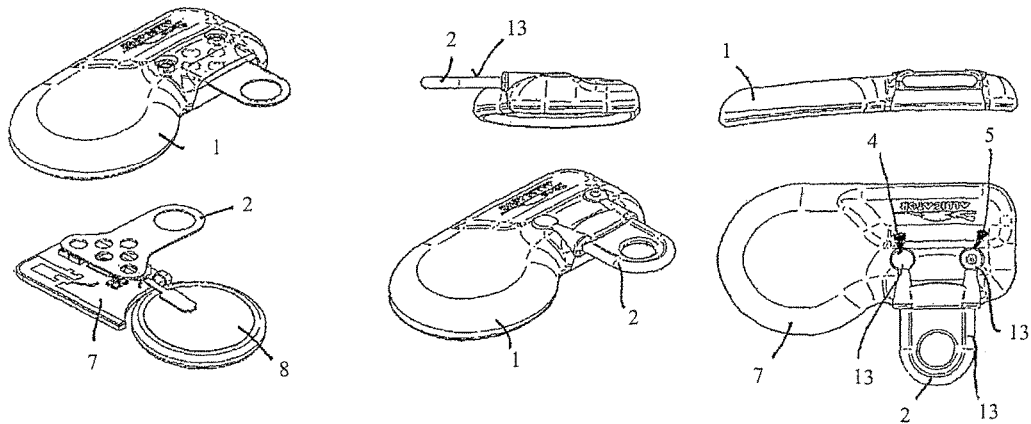
FIG. 5 shows different views of another exemplary embodiment of the invention.

FIGS. 4 and 5 represent two further exemplary embodiments of the invention in different views. Here again, the spring element 2 as well as regions of the housing 1 are coated with the soft component 13. It can be seen in particular that the spring element 2 has a large number of passage openings, by way of example three or more, in particular five or more passage openings, which are traversed by the material thereof as the housing 1 is being cast. It also appears clearly that the region of the spring element 2 protruding from the housing 1 after partial casting of the spring element 2 into the housing 1, is coated with the soft component, whereas also for this region the spring element may contain passage openings through which the soft component 13 penetrates.

Figure 6:
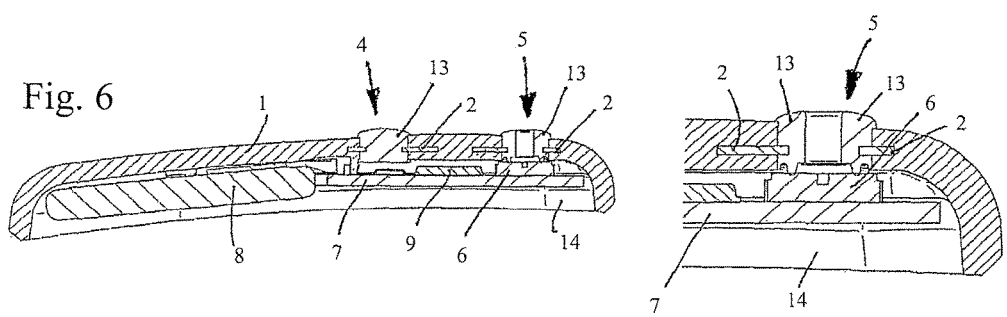
FIG. 6 shows two cross-sections through openings completely or partially sealed with the soft component.

FIG. 6 represents once again the openings 4 and 5 sealed by the soft component 13 in the housing 1. The opening 4 acts as an assembly opening to maintain the spring element 2 when casting the housing 1. The opening 5 acts as an assembly openings and additionally as an opening for guiding the air to the pressure sensor 6, which explains that the soft element 13 does not seal the opening 5 completely or seals it only via a pressure relief membrane.

Figure 7:
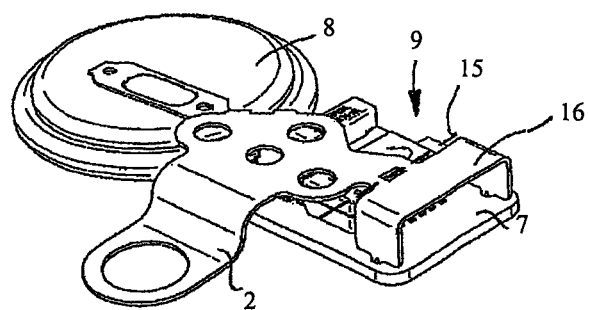
FIG. 7 shows a spring element designed as a single part with an aerial, which is separated therefrom after embedding in the housing to the connecting points for the aerial.
Figure 8:
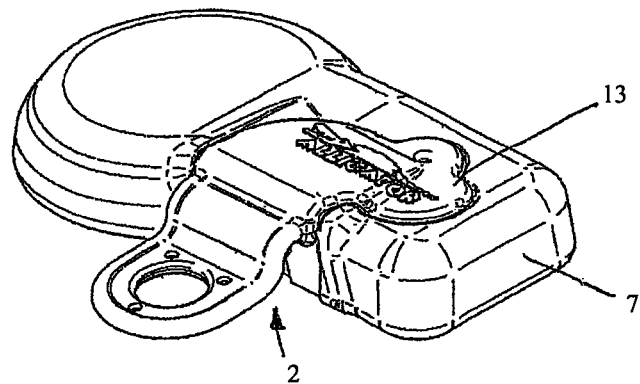
FIG. 8 shows the form of embodiment in FIG. 7 with the soft component thereon, which insulates the spring element and the aerial electrically from each other.

The embodiment of FIG. 7, in which corresponding components are indicated as before with the same reference signs, shows an aerial 16 for the signal transmitting device 9, which initially consists of a single part with or is integral with the spring element 2, for example of sheet metal, in particular by punching and/or bending or similar. This has the advantage that the spring element 2 together with the aerial 16 can be hold more easily when mounting the housing (non represented), in particular by casting or injection moulding. For example, the aerial 16 can be fastened to the circuit board 7 and carry the spring element 2, especially without supporting or maintaining additionally the spring element 2 during the manufacture of the housing. After manufacture of the housing (non represented), the spring element 2 is hold in the housing so that the connection between the spring element 2 and the aerial 16 can be separated, here by way of example along the line 15. Subsequently, the soft component 13 is mounted to insulate the aerial 16 with respect to the spring element 2. This is represented in FIG. 8. The opening in the housing 1, which was provided to maintain the dividing point between the spring element 2 and the aerial 16 accessible, is also sealed by the soft component 13.

The invention claimed is:

1. A tyre pressure sensing device for detecting a tyre pressure in a pneumatic tyre, comprising:
    a housing, comprising at least a contact surface for setting on a rim carrying the pneumatic tyre and containing a pressure sensor;
    a retainer fastenable to the rim, carrying the housing; and
    a spring element connected to the retainer and connected to the housing; whereby the spring element is embedded partially into the housing and the housing in the area in which the spring element is embedded, comprises at least one opening into the housing partially or completely sealed by a soft component, which surrounds the spring element partially, the soft component having a reduced hardness and higher elasticity than the housing.

2. A tyre pressure sensing device according to claim 1, wherein the spring element is connected to the housing in a non-detachable way.

3. A tyre pressure sensing device according to claim 2, wherein the spring element is linked to the housing, in a firmly bonded manner or in a positively locking manner.

4. A tyre pressure sensing device according to claim 2, wherein the spring element is traversed by the material of the housing.

5. A tyre pressure sensing device according to claim 4, wherein the housing is cast of synthetic material, in particular injection moulded, with the spring element inserted into the casting mould before the casting process, is finished so that the housing is molded around the spring element.

6. A tyre pressure sensing device according to claim 1, wherein the spring element comprises a leaf spring, comprising an even leaf spring in non-tensioned condition or a substantially even leaf spring, or a leaf spring comprising one or several angles of bend.

7. A tyre pressure sensing device according to claim 1, wherein the spring element has a through-bore at one of its axial ends, in particular a through-bore closed over the circumference, through which the retainer is inserted.

8. A tyre pressure sensing device according to claim 1, wherein the spring element is made of metal and/or carbon and is coated on its surface outside the housing partially or completely with the soft component, wherein the soft component is made of rubber or thermoplastic elastomer.

9. A tyre pressure sensing device according to claim 1, wherein the housing is coated at least partially or exclusively partially with the soft component.

10. A tyre pressure sensing device according to claim 9, wherein the soft component seals the pressure sensor against the housing.

11. A tyre pressure sensing device according to claim 1, wherein the housing contains a signal transmitting device, which is-connected to the pressure sensor, in order to send signals describing pressure values detected by the pressure sensor to a receiving device provided outside the tyre pressure sensing device, and the spring element is connected, acting as an aerial as a signal-carrying connection to an aerial at the signal transmitting device.

12. A tyre pressure sensing device according to claim 1, wherein the housing contains a signal transmitting device, which is connected to the pressure sensor, in order to send signals describing pressure values detected by the pressure sensor to a receiving device provided outside the tyre pressure sensing device, and the spring element is insulated by the soft component with respect to an aerial of the signal transmitting device.

13. A tyre pressure sensing device according to claim 11, wherein the spring element is in conductive contact with the retainer to be fastened to the rim, in order to transfer signals of the signal transmitting device to the retainer acting as an aerial.

14. A tyre pressure sensing device according to claim 11, wherein the spring element is electrically insulated by the soft component with respect to the retainer to be fastened to the tyre.

15. A method of producing a tyre pressure sensing device, comprising:
   providing a spring element built as a single piece with an aerial and
   subsequently separating the spring element and the aerial from each other at a dividing point
   filling the dividing point with a soft component for insulating the spring element with respect to the aerial and
   forming a housing around the spring element and the aerial and providing a signal transmitting device connected to a pressure sensor in the housing.

16. A method according to claim 15, wherein said forming step comprises the step of partially moulding the housing around the spring element and the aerial before said separating step.

17. A tyre pressure sensing device according to claim 3, wherein the spring element is traversed by the material of the housing.

18. A tyre pressure sensing device according to claim 2, wherein the spring element comprises a leaf spring, comprising an even leaf spring in non-tensioned condition or a substantially even leaf spring, or a leaf spring comprising one or several angles of bend.

19. A tyre pressure sensing device according to claim 3, wherein the spring element comprises a leaf spring, comprising in particular an even leaf spring in non-tensioned condition or a substantially even leaf spring, or a leaf spring comprising one or several angles of bend.

20. A tyre pressure sensing device according to claim 4, wherein characterised in that-the spring element comprises a leaf spring, comprising an even leaf spring in non-tensioned condition or a substantially even leaf spring, or a leaf spring comprising one or several angles of bend.

21. The tyre pressure sensing device according to claim 1, wherein the retainer comprises a tyre valve.

22. A tyre pressure sensing device according to claim 9, wherein the soft component closes an assembly opening in the housing holding the spring element.

23. The tyre pressure sensing device according to claim 1, wherein the at least one opening into the housing in the area in which the spring element is embedded extends through a wall of the housing.

24. A tyre pressure sensing device according to claim 2, wherein the spring element has a through-bore at one of its axial ends, in particular a through-bore closed over the circumference, through which the retainer is inserted.

* * * * *